(12) United States Patent
Iwagami (10) Patent No.: US 11,990,799 B2
(45) Date of Patent: May 21, 2024

(54) CAPACITOR MODULE, INVERTER MODULE, AND MOTOR UNIT

(71) Applicant: Nidec Elesys Corporation, Kawasaki (JP)

(72) Inventor: Naoki Iwagami, Kawasaki (JP)

(73) Assignee: NIDEC ELESYS CORPORATION, Kanagawa (JP)

( * ) Notice: Subject to any disclaimer, the term of this patent is extended or adjusted under 35 U.S.C. 154(b) by 267 days.

(21) Appl. No.: 17/522,986

(22) Filed: Nov. 10, 2021

(65) Prior Publication Data

US 2022/0173640 A1 Jun. 2, 2022

(30) Foreign Application Priority Data

Nov. 30, 2020 (JP) ................................. 2020-199017

(51) Int. Cl.
| | |
|---|---|
| H02K 11/33 | (2016.01) |
| H02K 3/50 | (2006.01) |
| H02K 9/19 | (2006.01) |
| H02K 11/01 | (2016.01) |

(52) U.S. Cl.
CPC .............. H02K 11/33 (2016.01); H02K 3/50 (2013.01); H02K 9/19 (2013.01); H02K 11/0141 (2020.08); H02K 2203/09 (2013.01)

(58) Field of Classification Search
CPC ........ H02K 5/225; H02K 11/33; H02K 11/30; H02K 11/0141; H02K 9/19; H02K 3/50; H02K 3/52; H02K 5/24; H02K 2203/09; H02K 2211/03

USPC .......................................................... 310/71
See application file for complete search history.

(56) References Cited

U.S. PATENT DOCUMENTS

| | | | |
|---|---|---|---|
| 2011/0188279 A1* | 8/2011 | Aiba ........................ | H05K 7/20 363/141 |
| 2011/0228508 A1* | 9/2011 | Inuduka ................. | H01G 4/228 361/811 |
| 2016/0294301 A1* | 10/2016 | Yokoyama ........... | H05K 5/0017 |

FOREIGN PATENT DOCUMENTS

JP          2019-172204 A      10/2019

* cited by examiner

Primary Examiner — Alexander A Singh
(74) Attorney, Agent, or Firm — Keating & Bennett, LLP (57) ABSTRACT

A capacitor module that smooths a voltage of an inverter circuit includes a supply assembly including a connection terminal to the inverter circuit, an alternating-current assembly including a capacitor and a first bus bar, and a direct-current assembly including a second bus bar connecting a DC power source and the supply assembly. The alternating-current assembly and the direct-current assembly are side by side in a plan view and one side view of the capacitor module, and are arranged with the side surfaces thereof opposing each other in an opposite side view. The supply assembly is located inside an outer peripheral region collectively surrounding both the alternating-current assembly and the direct-current assembly in the plan view.

20 Claims, 10 Drawing Sheets

CAPACITOR MODULE, INVERTER MODULE, AND MOTOR UNIT

CROSS-REFERENCE TO RELATED APPLICATIONS

The present application claims priority under 35 U.S.C. § 119 to Japanese Patent Application No. 2020-199017, filed on Nov. 30, 2020, the entire contents of which are hereby incorporated herein by reference.

1. Field of the Invention

The present disclosure relates to a capacitor module, an inverter module, and a motor.

2. Background

In an inverter module, a capacitor module that smooths a current of an inverter circuit is used. The capacitor module includes a capacitor and a plurality of bus bars. Each of the plurality of bus bars has a connection terminal to the capacitor, a connection terminal to external power source wiring, and a connection terminal to the inverter circuit.

In a capacitor module that smooths a voltage of an inverter circuit, a bus bar connecting a power supply, a capacitor, and an inverter circuit is likely to have a high temperature. In order to improve the performance of the capacitor module, a reduction in equivalent series inductance (ESL) is required. Therefore, a capacitor with reduced thermal influence from the bus bar and reduced ESL is required.

SUMMARY

According to an example embodiment of the present disclosure, a capacitor module that smooths a voltage of an inverter circuit is provided. The capacitor module includes a supply assembly including a connection terminal to the inverter circuit, an alternating-current assembly including a capacitor and a plate-shaped first bus bar connecting the capacitor and the supply assembly, and a direct-current assembly including a plate-shaped second bus bar connecting a DC power source and the supply assembly. The alternating-current assembly and the direct-current assembly are side by side in a plan view and one side view of the capacitor module, and are arranged with side surfaces of the alternating-current assembly and the direct-current assembly opposing each other in an opposite side view of the capacitor module. The supply assembly is located inside an outer peripheral region collectively surrounding both the alternating-current assembly and the direct-current assembly in a plan view.

The above and other elements, features, steps, characteristics and advantages of the present disclosure will become more apparent from the following detailed description of the example embodiments with reference to the attached drawings.

DETAILED DESCRIPTION

Hereinafter, inverter modules and capacitor modules according to example embodiments of the present disclosure will be described with reference to the drawings.

In the drawings referred to in the following description, an XYZ coordinate system is appropriately illustrated as a three-dimensional orthogonal coordinate system. The XYZ coordinate system defines the vertical direction in FIG. 1 as the Z-axis direction. The +Z direction is the upper side (opposite to the gravity direction), and the −Z direction is the lower side (the gravity direction). The X-axis direction is a direction orthogonal to the Z-axis direction, and indicates a direction in which the direct-current assembly and the alternating-current assembly in the capacitor module are arranged. A Y-axis direction is a direction orthogonal to both the X-axis direction and the Z-axis direction.

In the present specification, "plan view" means that the inverter module and the capacitor module are viewed from the Z-axis direction. Note that the posture of the capacitor module in this specification is an example, and does not limit the posture in which the capacitor module is actually attached.

Figure 1:
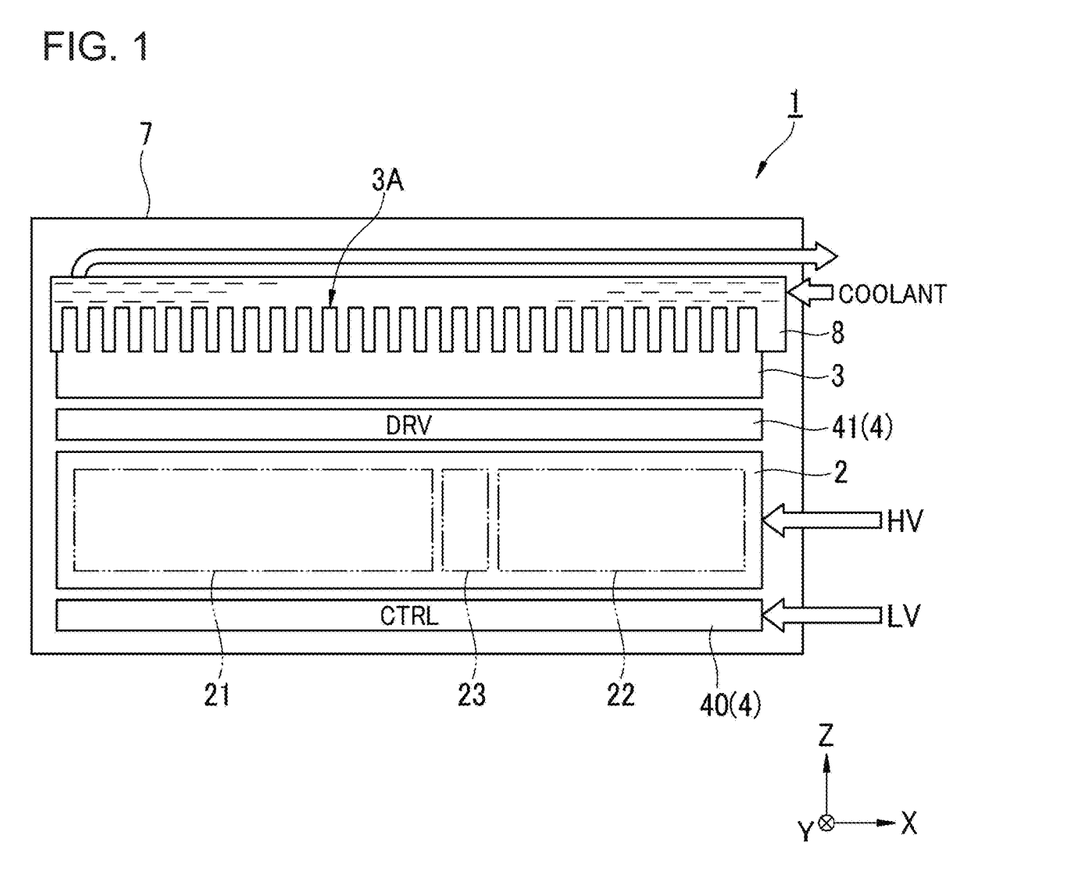
FIG. 1 is an explanatory diagram schematically illustrating a longitudinal cross section of an inverter module according to an example embodiment of the present disclosure.
Figure 2:
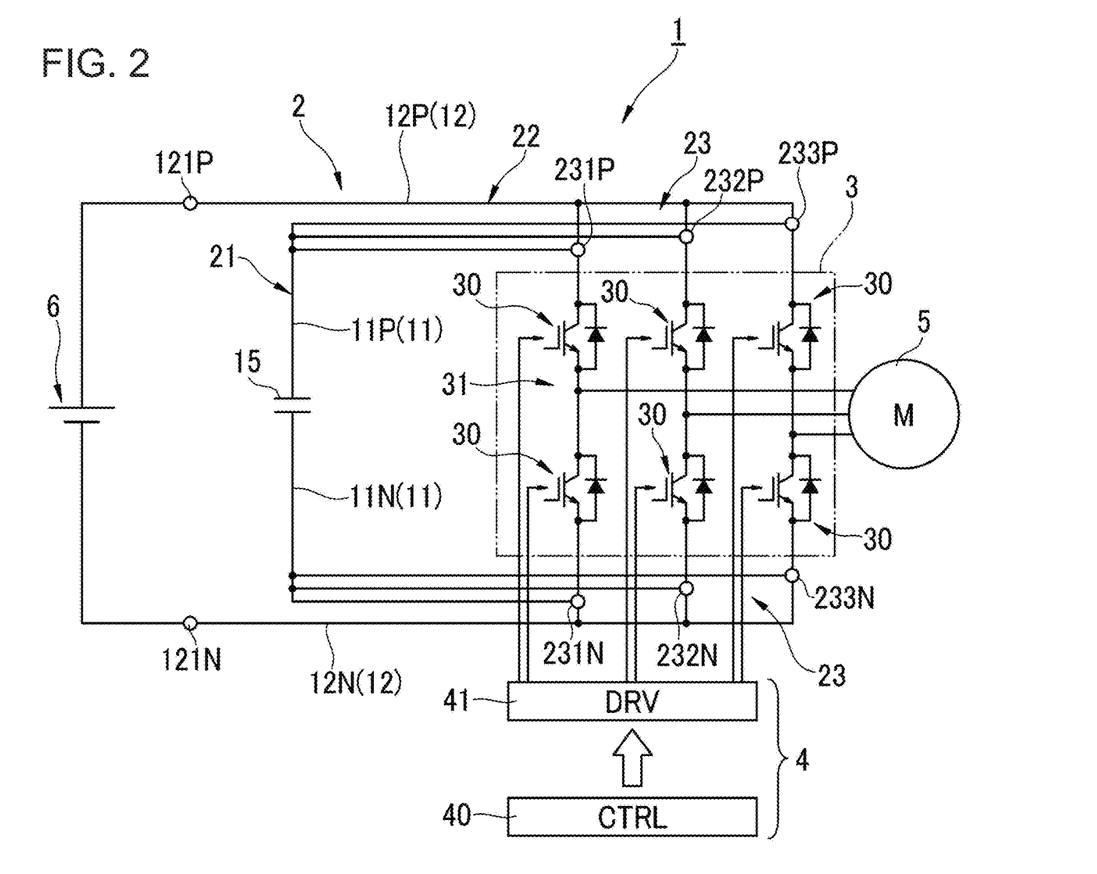
FIG. 2 is a circuit block diagram of the inverter module.

FIG. 1 is an explanatory diagram schematically illustrating a longitudinal cross section of an inverter module. FIG. 2 is a circuit block diagram of the inverter module.

As illustrated in FIG. 1, an inverter module 1 of the present example embodiment includes a capacitor module 2, a power module 3, a control module 4 including a control board 40 and a drive board 41, a housing 7, and a refrigerant flow path 8.

The housing 7 houses the capacitor module 2, the power module 3, the control module 4, and the refrigerant flow path 8 therein. The components of the inverter module 1 are stacked and disposed in the vertical direction (Z-axis direction) inside the housing 7. Specifically, the control board 40, the capacitor module 2, the drive board 41, the power module 3, and the refrigerant flow path 8 are stacked in this order from below. Note that this arrangement is an example, and the capacitor module 2 and the power module 3 may be disposed side by side on the XY plane.

As illustrated in FIG. 2, the inverter module 1 is connected between a DC power source 6 and a motor 5. The inverter module 1 converts a direct current supplied from the DC power source 6 into an alternating current and supplies the alternating current to the motor 5.

The motor 5 of the present example embodiment is a three-phase motor. The motor 5 may be a multi-phase motor having four or more phases. The motor 5 is connected to the power module 3 of the inverter module 1. The DC power source 6 is, for example, a secondary battery or an electric double layer capacitor. The DC power source 6 is connected to the connection terminals 121P and 121N for an external power source of the inverter module 1.

Instead of the motor 5, a generator may be connected. In this case, the inverter module 1 converts power input from the generator into DC power and charges the DC power source 6.

The power module 3 includes an inverter circuit 31 including a plurality of switching elements 30. In the present example embodiment, the switching element 30 includes an insulated gate bipolar transistor (IGBT). The switching element 30 may be a power semiconductor element other than the IGBT. The switching element 30 may be a power metal oxide semiconductor field effect transistor (MOSFET), a SiC-MOSFET, or a GaN-MOSFET.

The inverter circuit 31 is a three-phase inverter including six switching elements 30. That is, the inverter circuit 31 has three phases corresponding to the U-phase, the V-phase, and the W-phase, which are arms including two switching elements. A midpoint of each arm is connected to the motor 5.

The positive-side terminals of the three arms are connected to the positive-side supply terminals 231P, 232P, and 233P of the capacitor module 2. The negative-side terminals of the three arms are connected to the negative-side supply terminals 231N, 232N, and 233N of the capacitor module 2.

The power module 3 includes a cooling member 3A illustrated in FIG. 1. The cooling member 3A cools the inverter circuit 31. A part of the cooling member 3A is located in the refrigerant flow path 8. The refrigerant flow path 8 is provided in the housing 7 or the power module 3. The heat of the inverter circuit 31 is dissipated to the refrigerant by contact between the refrigerant flowing in the refrigerant flow path 8 and the cooling member 3A. The refrigerant flowing in the refrigerant flow path 8 is, for example, an ethylene glycol aqueous solution (LLC). The refrigerant may be water. The inverter module 1 may include a mechanism for cooling the capacitor module 2.

The control module 4 includes the control board 40 and the drive board 41.

The control board 40 generates a control signal for switching control of the plurality of switching elements 30 of the inverter circuit 31. The drive board 41 generates drive power for the switching elements 30 based on a control signal input from the control board 40.

The control module 4 is connected to a host device such as a vehicle control device via a controller area network (CAN). The control module 4 executes drive control of the motor 5 via the inverter circuit 31 based on a control signal input from the host device.

As illustrated in FIG. 2, the capacitor module 2 is connected to the DC power source 6 and the power module 3. Hereinafter, the capacitor module 2 will be described in detail with reference to FIG. 3 and subsequent drawings.

Figure 3:
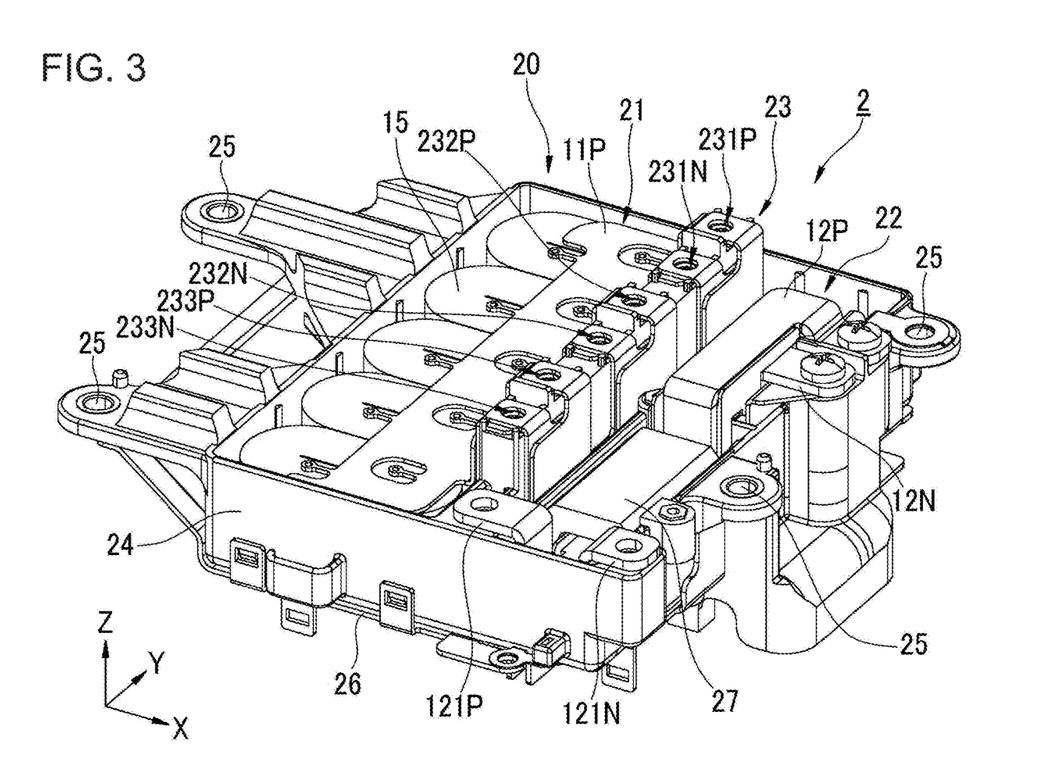
FIG. 3 is a perspective view of a capacitor module according to an example embodiment of the present disclosure when viewed obliquely from above.
Figure 4:
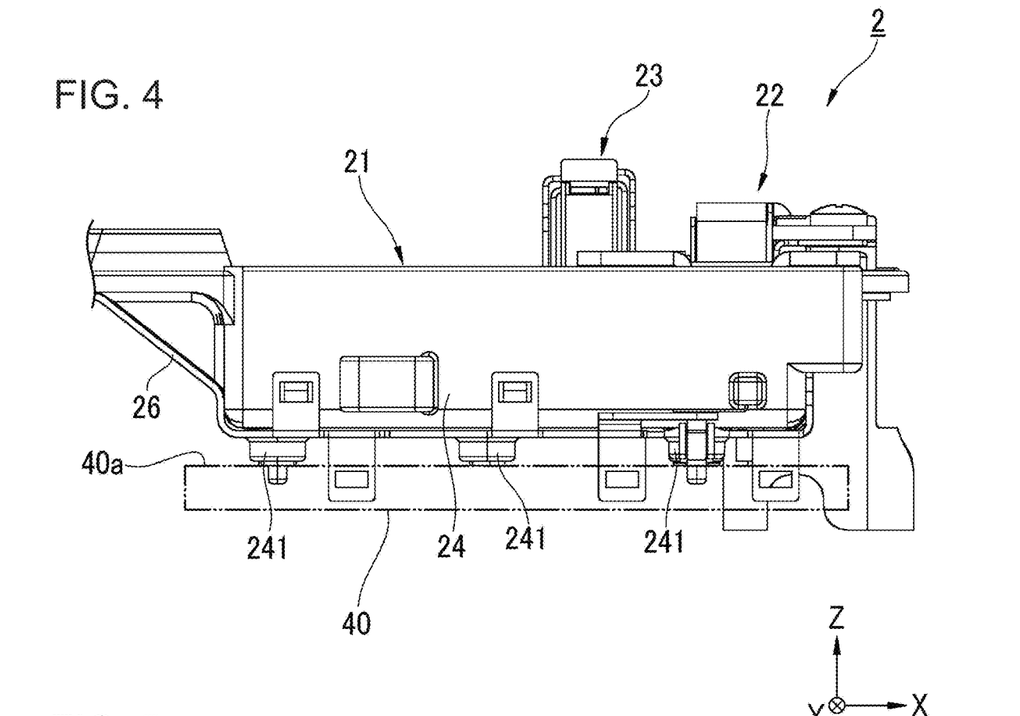
FIG. 4 is a side view of the capacitor module.
Figure 5:
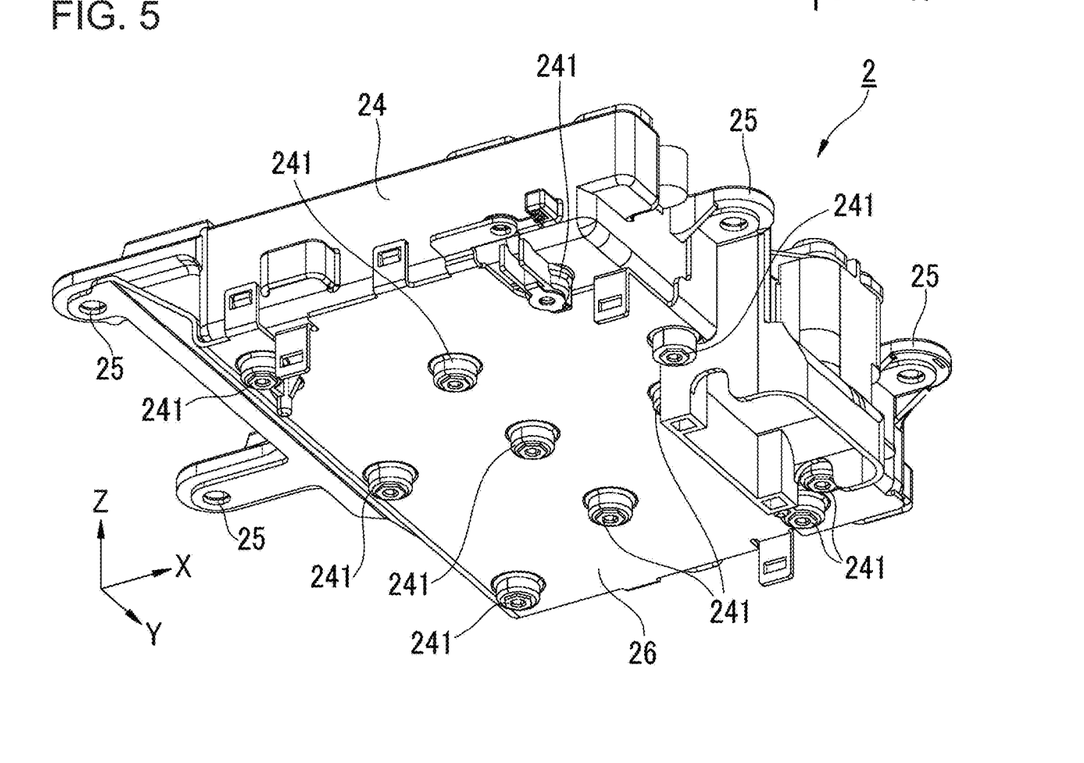
FIG. 5 is a perspective view of the capacitor module when viewed obliquely from below.
Figure 6:
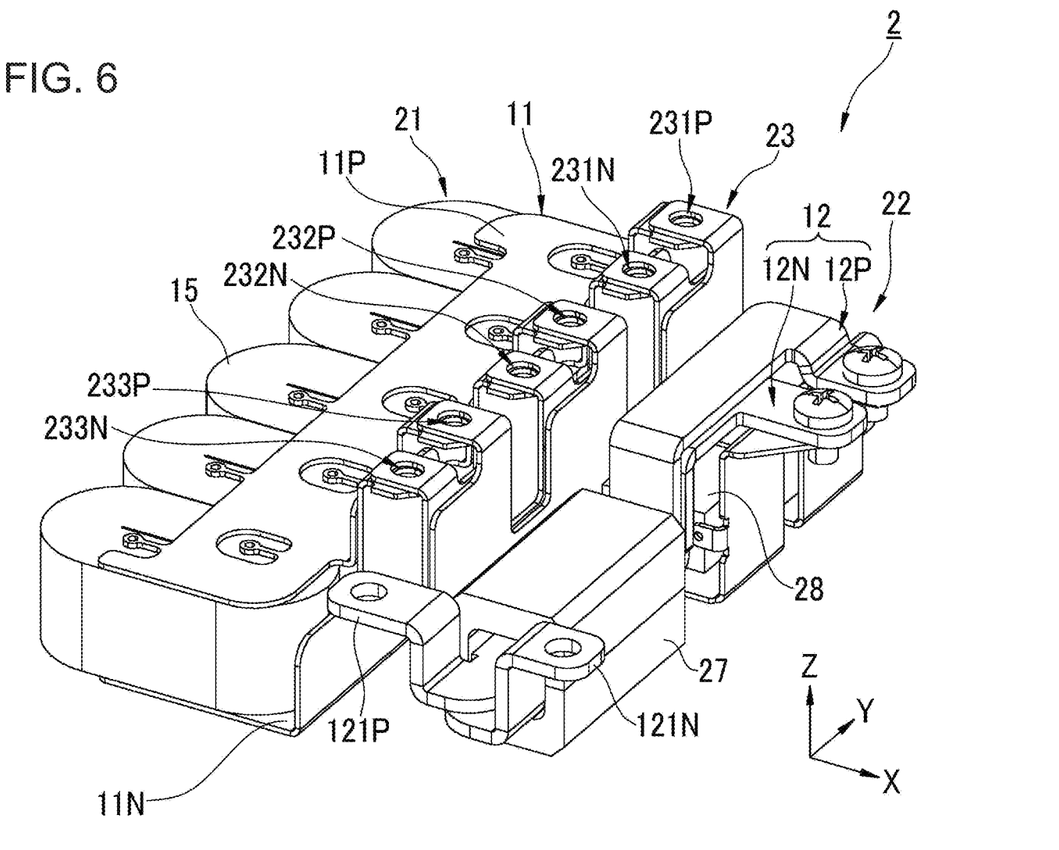
FIG. 6 is a perspective view illustrating an internal structure of the capacitor module.
Figure 7:
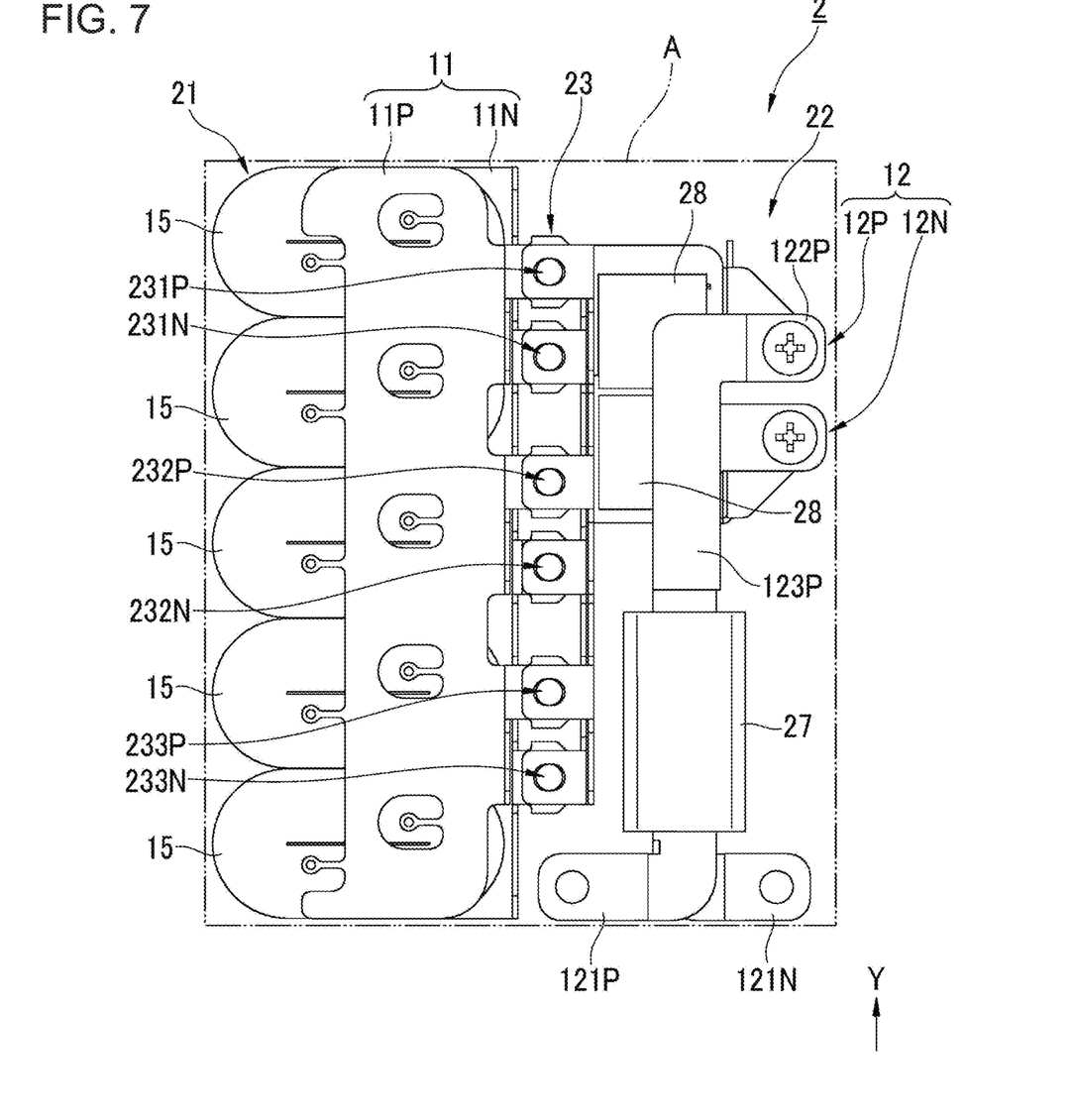
FIG. 7 is a plan view of the capacitor module.
Figure 8:
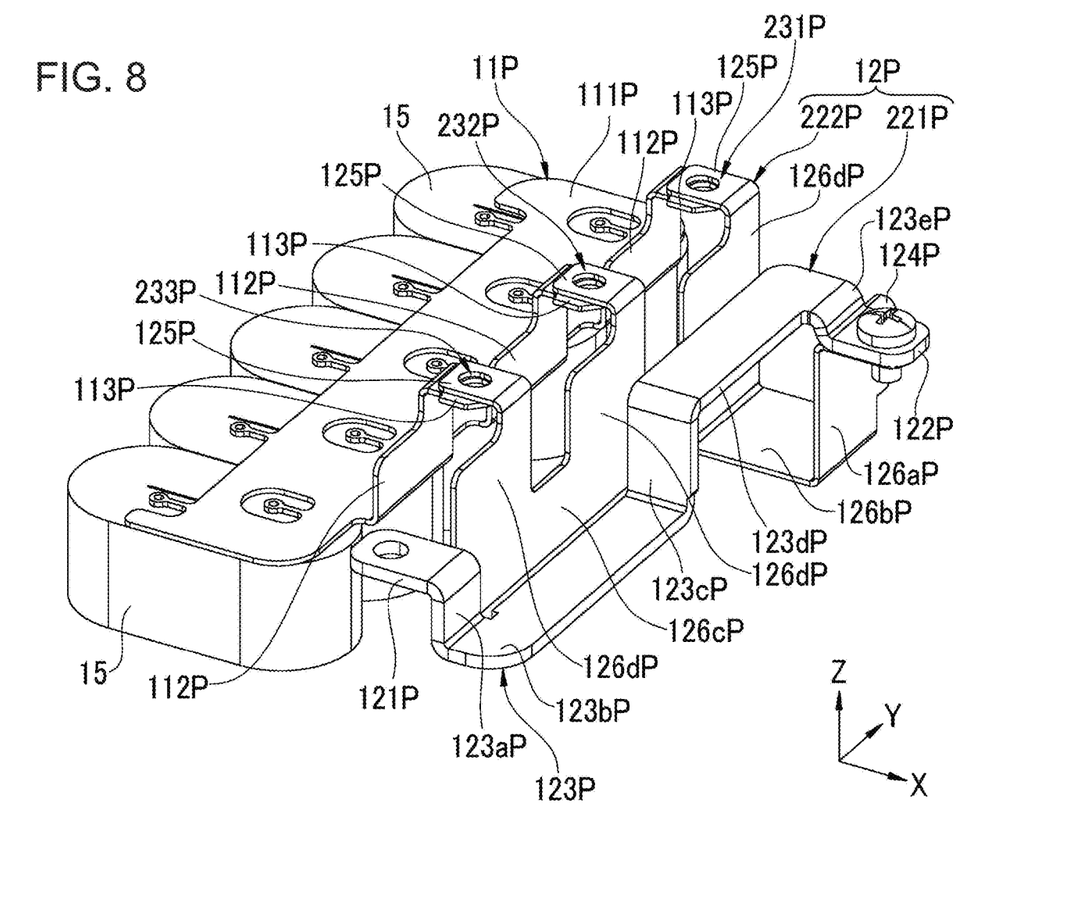
FIG. 8 is a perspective view illustrating a positive-side bus bar of a first bus bar and a second bus bar according to an example embodiment of the present disclosure.
Figure 9:
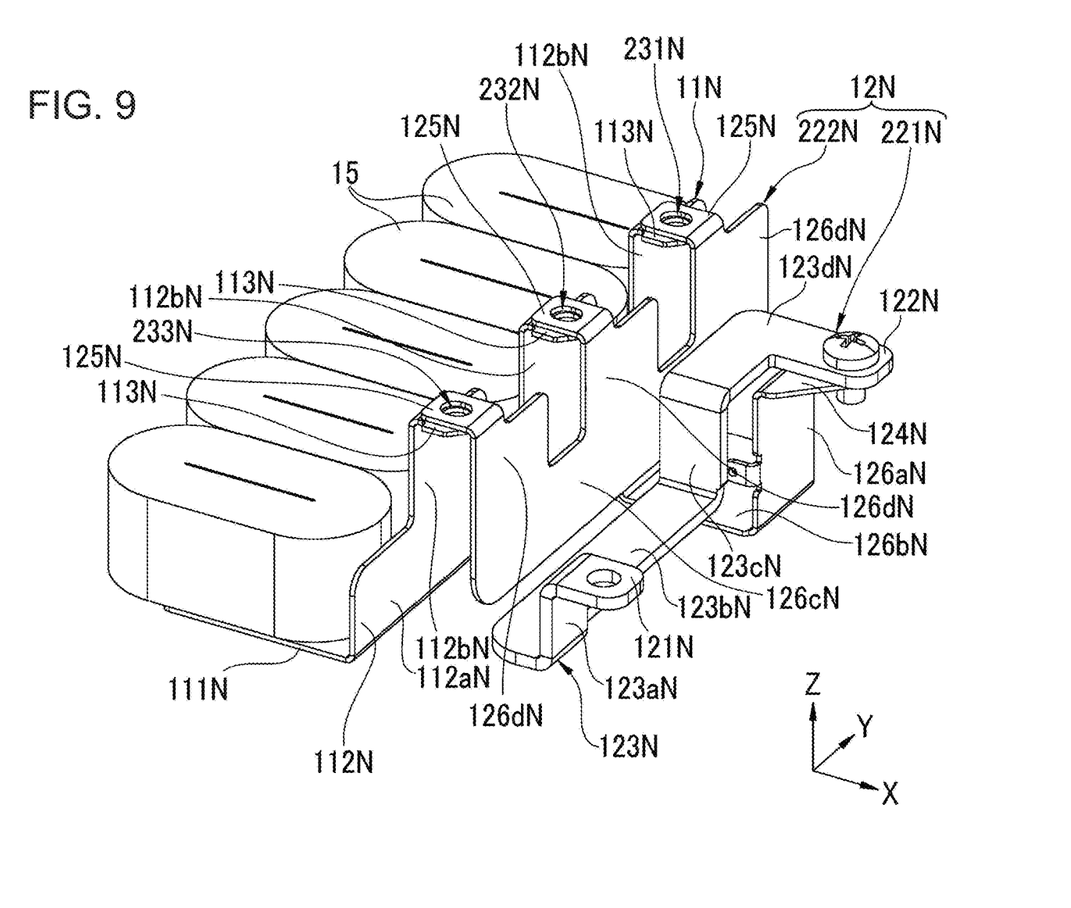
FIG. 9 is a perspective view illustrating a negative-side bus bar of the first bus bar and the second bus bar.
Figure 10:
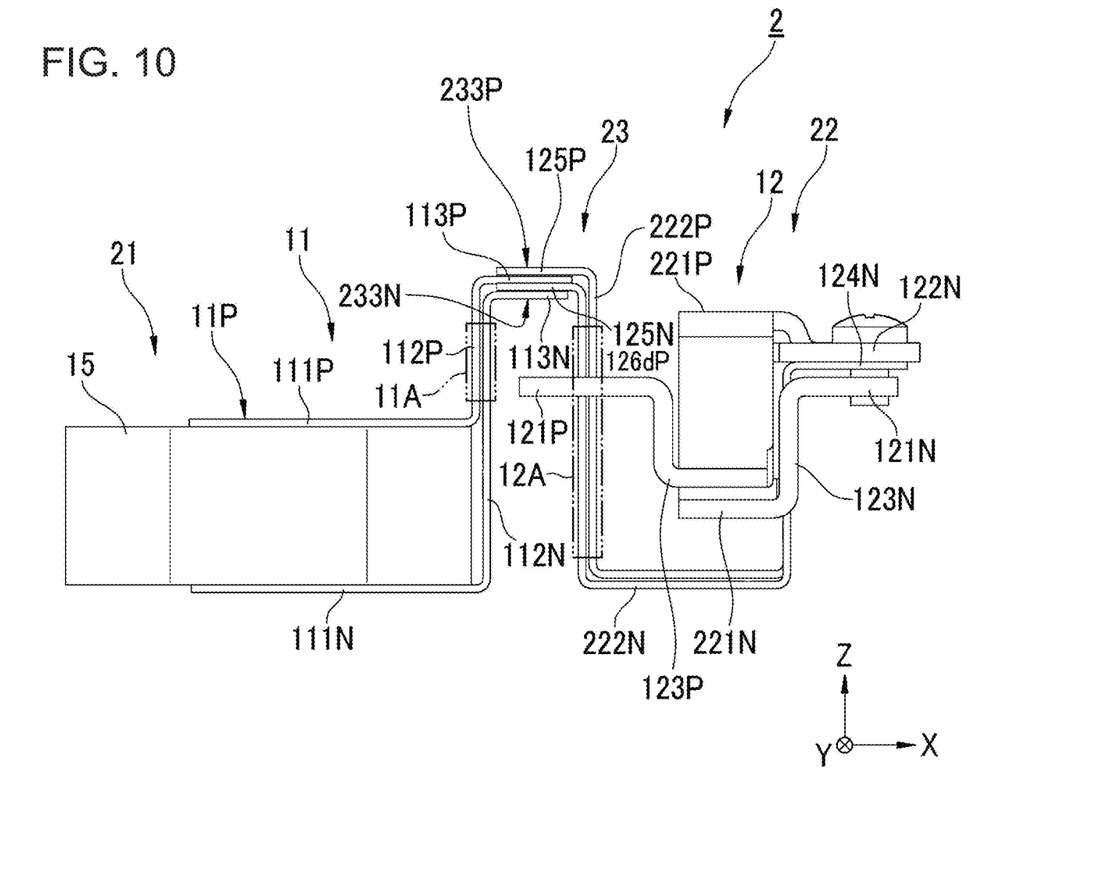
FIG. 10 is a side view of a capacitor, a first bus bar, and a second bus bar according to an example embodiment of the present disclosure.

FIG. 3 is a perspective view of the capacitor module 2 when viewed obliquely from above. FIG. 4 is a side view of the capacitor module 2. FIG. 5 is a perspective view of the capacitor module 2 when viewed obliquely from below. FIG. 6 is a perspective view illustrating an internal structure of the capacitor module 2. FIG. 7 is a plan view of the capacitor module 2. FIG. 8 is a perspective view illustrating a positive-side bus bar of a first bus bar 11 and the second bus bar. FIG. 9 is a perspective view illustrating a negative-side bus bar of the first bus bar and the second bus bar. FIG. 10 is a side view of the capacitor, the first bus bar, and the second bus bar.

As illustrated in FIGS. 3 to 7, the capacitor module 2 includes an alternating-current assembly 21, a direct-current assembly 22, and a supply assembly 23.

The alternating-current assembly 21 includes five capacitors 15 and the plate-shaped first bus bar 11 that connects the five capacitors 15 and the supply assembly 23. In the present example embodiment, five capacitors 15 are arranged along the Y-axis direction. The alternating-current assembly 21 has a longitudinal shape in the Y-axis direction as a whole. The number of the capacitors 15 of the alternating-current assembly 21 is not limited to 5, and may be any number of 4 or less or 6 or more.

The five capacitors 15 have electrodes on upper and lower surfaces. The first bus bar 11 includes the positive-side first bus bar 11P connected to the electrode on the upper surface of the capacitor 15, and the negative-side first bus bar 11N connected to the electrode on the lower surface of the capacitor 15.

As illustrated in FIGS. 8 and 10, the positive-side first bus bar 11P includes a capacitor side terminal 111P extending in the Y-axis direction on the upper surface of each of the five capacitors, three wiring portions 112P extending upward from the direct-current assembly 22 side (+X side) end portion of the capacitor side terminal 111P, and three supply-side terminals 113P extending in the horizontal direction from the upper ends of the three wiring portions 112P, from the end portion on the direct-current assembly 22 side, toward the direct-current assembly 22. The width of the wiring portion 112P in the Y-axis direction is larger than the width of the supply-side terminal 113P in the Y-axis direction. The supply-side terminal 113P has a through hole penetrating the supply-side terminal 113P in the plate thickness direction (Z-axis direction). The three supply-side terminals 113P, together with three supply-side terminals 125P of a positive-side second bus bar 12P to be described later, constitute three supply terminals 231P, 232P, and 233P of the supply assembly 23.

As illustrated in FIGS. 9 and 10, a negative-side first bus bar 11N includes a capacitor side terminal 111N extending in the Y-axis direction on the upper surfaces of the five capacitors, a wiring portion 112N extending upward from the direct-current assembly 22 side (+X side) end portion of the capacitor side terminal 111N, and three supply-side terminals 113N extending in the horizontal direction from the upper end portion of wiring portion 112N, from the end portion on the direct-current assembly 22 side, toward the direct-current assembly 22. The wiring portion 112N includes a main portion 112aN extending upward with a width equal to the width of the capacitor side terminal 111N in the Y-axis direction, and three branch portions 112bN extending upward from the upper end portion of the main portion 112aN. The supply-side terminal 113N extends from the distal end portion of the branch portion 112bN. The width of the branch portion 112bN in the Y-axis direction is larger than the width of the supply-side terminal 113N in the Y-axis direction. The supply-side terminal 113N has a through hole penetrating the supply-side terminal 113N in the plate thickness direction (Z-axis direction). The three supply-side terminals 113N, together with three supply-side terminals 125N of a negative-side second bus bar 12N to be described later, constitutes three supply terminals 231N, 232N, and 233N of the supply assembly 23.

As illustrated in FIG. 10, the positive-side first bus bar 11P and the negative-side first bus bar 11N of first bus bar 11 are disposed close to each other in the X-axis direction at a portion extending upward toward supply assembly 23 (wiring portion 112P, wiring portion 112N). That is, first bus bar 11 has, between the capacitor 15 and the supply assembly 23, a proximity arrangement portion 11A where the positive-side first bus bar 11P and the negative-side first bus bar 11N overlap and approach each other in the plate thickness direction.

According to this configuration, since the directions of the current, of the wiring portion 112P and the wiring portion 112N, flowing between the capacitor 15 and supply assembly 23 are opposite to each other, the parasitic inductance of the positive-side first bus bar 11P and the parasitic inductance of the negative-side first bus bar 11N cancel each other. Accordingly, equivalent series inductance (ESL) of the capacitor 15 can be reduced.

In the proximity arrangement portion 11A illustrated in FIG. 10, an insulating sheet such as insulating paper may be interposed between the wiring portion 112P and the wiring portion 112N. The thickness of the insulating sheet is, for example, 0.05 mm or more and less than 1 mm. The thickness of the insulating sheet may be 0.1 mm or more. The thickness of the insulating sheet may be 0.7 mm or less, or may be 0.5 mm or less.

That is, the positive-side first bus bar 11P and the negative-side first bus bar 11N may face each other with an insulating sheet thinner than the thickness of the first bus bar interposed therebetween at a position close to each other. According to this configuration, the wiring portion 112P and the wiring portion 112N can be brought close to each other up to the thickness of the insulating sheet. By bringing them as close as possible, the ESL reduction effect can be enhanced.

The direct-current assembly 22 includes a plate-shaped second bus bar 12 that connects the DC power source 6 and the supply assembly 23. As illustrated in FIGS. 6 and 7, the second bus bar 12 includes the positive-side second bus bar 12P connected to the positive side of the DC power source 6 and the negative-side second bus bar 12N connected to the negative side of the DC power source 6.

As illustrated in FIGS. 8 and 10, the positive-side second bus bar 12P includes two bus bars: a power-side bus bar 221P and a supply-side bus bar 222P.

The power-side bus bar 221P includes a connection terminal 121P to the DC power source 6 and a connection terminal 122P to the supply-side bus bar 222P. In the power-side bus bar 221P, the connection terminal 121P and the connection terminal 122P are connected via a wiring portion 123P.

The wiring portion 123P extends along the Y-axis direction from the connection terminal 121P located at the −Y side end portion of the direct-current assembly 22 toward the connection terminal 122P located at the +Y side end portion of the direct-current assembly 22. The wiring portion 123P includes a plurality of wiring portions 123aP to 123eP.

The wiring portion 123aP extends downward from the end portion, of the connection terminal 121P, opposite (+X side) to the alternating-current assembly 21. The wiring portion 123bP extends from the lower end portion of the wiring portion 123aP toward the +Y side and reaches the central portion of the direct-current assembly 22 in the Y-axis direction. The wiring portion 123cP extends upward from the +Y side end portion of the wiring portion 123bP. The wiring portion 123dP extends from the upper end portion of the wiring portion 123cP toward the +Y side. The wiring portion 123eP extends from the +Y side end portion of the wiring portion 123dP toward the +X side and is connected to the connection terminal 122P.

Among the wiring portions 123aP to 123eP, the wiring portions 123bP, 123cP, and 123dP extend with their plate faces facing in the vertical direction (Z-axis direction) or in the Y-axis direction. That is, the plate faces of the wiring portions 123bP, 123cP, and 123dP extend along the direction (X-axis direction) in which the alternating-current assembly 21 and the direct-current assembly 22 are arranged. That is, the power-side bus bar 221P has, between the two connection terminals 121P and 122P, a portion where the plate faces extend along the direction (X-axis direction) in which the alternating-current assembly 21 and the direct-current assembly 22 are arranged.

According to this configuration, since the plate faces of the wiring portions 123bP, 123cP, and 123dP do not face the alternating-current assembly 21 (−X side), the heat dissipated from the plate faces is less likely to be directed toward the alternating-current assembly 21. As a result, the heat of the power-side bus bar 221P, which has high temperature due to the large current flowing, is less likely to be transferred to the capacitor 15.

The supply-side bus bar 222P includes a connection terminal 124P to the power-side bus bar 221P, and three supply-side terminals 125P connected to the supply assembly 23. The connection terminal 124P is screwed to the connection terminal 122P of the power-side bus bar 221P. In the supply-side bus bar 222P, the connection terminal 124P and the three supply-side terminals 125P are connected via a wiring portion 126P.

The wiring portion 126P extends in the X-axis direction in plan view from the connection terminal 124P located at the end portion, of the direct-current assembly 22, opposite (+X side) to the alternating-current assembly 21 toward the supply-side terminal 125P located at the supply assembly 23. The wiring portion 126P includes a plurality of wiring portions 126aP to 126dP.

The wiring portion 126aP extends downward from the end portion, of the connection terminal 124P, toward the alternating-current assembly 21 (−X side). The wiring portion 126bP extends from the lower end portion of the wiring portion 126aP toward the alternating-current assembly 21. The wiring portion 126cP extends upward and toward the connection terminal 121P (−Y side) from the end portion, of the wiring portion 126bP, toward the alternating-current assembly 21. That is, the wiring portion 126cP extends along the Y-axis direction and the Z-axis direction. The wiring portion 126dP extends upward from three portions of the upper end portion of the wiring portion 126cP, and is connected to the supply-side terminal 125P.

The supply-side terminal 125P has a through hole penetrating the supply-side terminal 125P in the plate thickness direction (Z-axis direction). The three supply-side terminals 125P together with the three supply-side terminals 113P of the positive-side first bus bar 11P constitute the three supply terminals 231P, 232P, and 233P of the supply assembly 23.

As illustrated in FIGS. 9 and 10, the negative-side second bus bar 12N includes two bus bars: a power-side bus bar 221N and a supply-side bus bar 222N.

The power-side bus bar 221N includes a connection terminal 121N to the DC power source 6 and a connection terminal 122N to the supply-side bus bar 222N. In the power-side bus bar 221N, the connection terminal 121N and the connection terminal 122N are connected via a wiring portion 123N.

The wiring portion 123N extends along the Y-axis direction from the connection terminal 121N located at the −Y side end portion of the direct-current assembly 22 toward the connection terminal 122N located at the +Y side end portion of the direct-current assembly 22. The wiring portion 123N includes a plurality of wiring portions 123aN to 123dN.

The wiring portion 123aN extends downward from the end portion, of the connection terminal 121N, toward the alternating-current assembly 21 (−X side). The wiring portion 123bN extends from the lower end portion of the wiring portion 123aN to the +Y side and reaches the central portion of the direct-current assembly in the Y-axis direction. The wiring portion 123cN extends upward from the +Y side end portion of the wiring portion 123bN. The wiring portion 123dN extends from the upper end portion of the wiring portion 123cN to the +Y side and is connected to the end portion, of the connection terminal 122N, toward the alternating-current assembly 21 (−X side).

Among the wiring portions 123aN to 123dN, the wiring portions 123bN, 123cN, and 123dN extend with their plate faces facing in the vertical direction (Z-axis direction) or in the Y-axis direction. That is, the plate faces of the wiring portions 123bN, 123cN, and 123dN extend along the direction (X-axis direction) in which the alternating-current assembly 21 and the direct-current assembly 22 are arranged. That is, the power-side bus bar 221N has, between the two connection terminals 121N and 122N, a portion where the plate faces extends along the direction (X-axis direction) in which the alternating-current assembly 21 and the direct-current assembly 22 are arranged.

According to this configuration, since the plate faces of the wiring portions 123bN, 123cN, and 123dN do not face the alternating-current assembly 21 (−X side), the heat dissipated from the plate faces is less likely to be directed to the alternating-current assembly 21. As a result, the heat of the power-side bus bar 221N that has high temperature due to the large current flowing is less likely to be transferred to the capacitor 15.

Supply-side bus bar 222N includes a connection terminal 124N to the power-side bus bar 221N, and three supply-side terminals 125N connected to the supply assembly 23. The connection terminal 124N is screwed to power-side bus bar 221N. In the supply-side bus bar 222N, the connection terminal 124N and the three supply-side terminals 125N are connected via a wiring portion 126N.

The wiring portion 126N extends in the X-axis direction in plan view from the connection terminal 124N located at the end portion, of the direct-current assembly 22, opposite (+X side) to the alternating-current assembly 21 toward the supply-side terminal 125N located in the supply assembly 23. The wiring portion 126N includes a plurality of wiring portions 126aN to 126dN.

The wiring portion 126aN extends downward from the end portion, of the connection terminal 124N, toward the alternating-current assembly 21 (−X side). The wiring portion 126bN extends from the lower end portion of the wiring portion 126aN toward the alternating-current assembly 21. The wiring portion 126cN extends upward and toward the connection terminal 121N (−Y side) from the end portion, of the wiring portion 126bN, toward the alternating-current assembly 21. That is, the wiring portion 126cN extends along the Y-axis direction and the Z-axis direction. The wiring portion 126dN extends upward from three portions of the upper end portion of the wiring portion 126cN, and is connected to the supply-side terminal 125N.

The supply-side terminal 125N has a through hole penetrating the supply-side terminal 125N in the plate thickness direction (Z-axis direction). The three supply-side terminals 125N, together with three supply-side terminals 113N of the negative-side first bus bar 11N, constitutes the three supply terminals 231N, 232N, and 233N of the supply assembly 23.

As illustrated in FIG. 10, also in the second bus bar 12, the supply-side bus bars 222P and 222N are disposed close to each other in the plate thickness direction in the vicinity of the supply assembly 23. More specifically, in a proximity arrangement portion 12A illustrated in FIG. 10, the wiring portion 126cP of the wiring portion 126P and the wiring portion 126cN of the wiring portion 126N are disposed close to each other in the plate thickness direction, and the wiring portion 126dP and the wiring portion 126dN are disposed close to each other in the plate thickness direction.

Also, in the proximity arrangement portion 12A, a thin insulating sheet such as insulating paper may be interposed between the supply-side bus bars 222P and 222N. That is, the positive-side second bus bar 12P and the negative-side second bus bar 12N may face each other with an insulating sheet thinner than the thickness of the second bus bar 12 interposed therebetween at a position close to each other. According to this configuration, the distance between the bus bars can be reduced, and the direct-current assembly 22 can be easily downsized.

Even at a position other than the above, the insulating sheet may be disposed between the bus bars at a position where the bus bars are close to each other.

As illustrated in FIGS. 6 and 7, the capacitor module 2 includes a magnetic core 27 and two filter capacitors 28 in the direct-current assembly 22.

Figure 11:
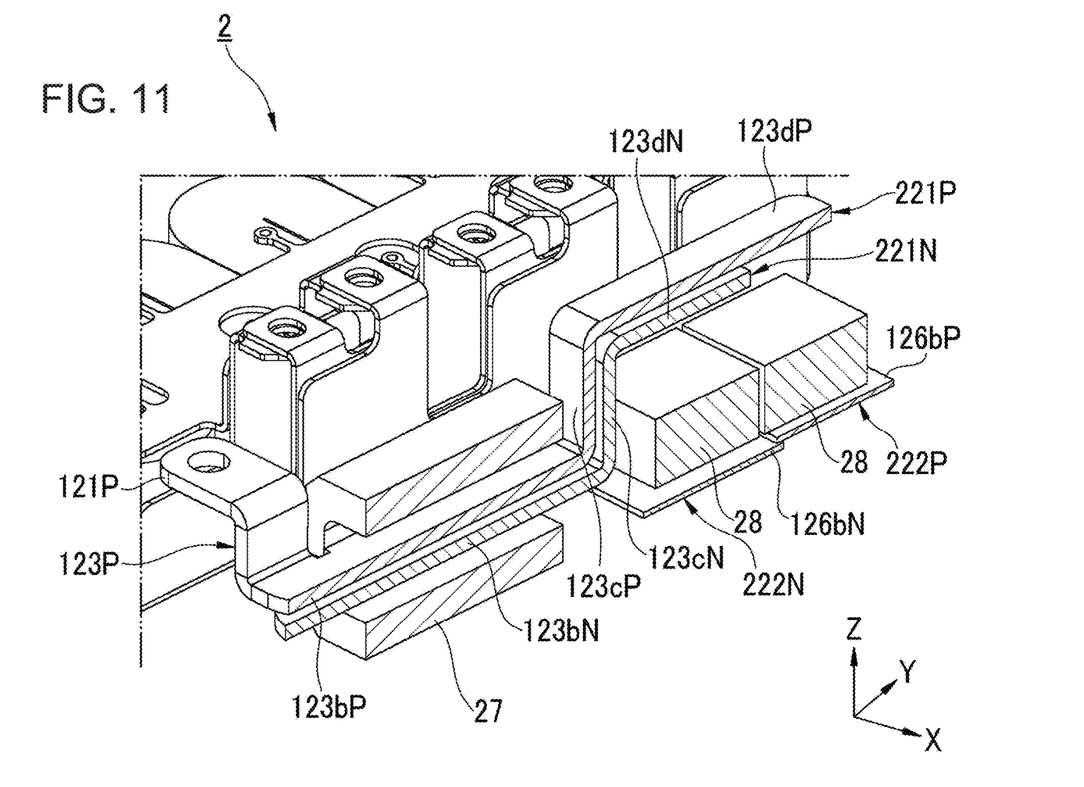
FIG. 11 is a cross-sectional view of the capacitor module in a portion including a magnetic core and a filter capacitor.

FIG. 11 is a cross-sectional view of the capacitor module in a portion including the magnetic core 27 and the filter capacitor 28.

The magnetic core 27 is made of a cylindrical magnetic material. The magnetic core 27 is, for example, a ferrite core. The magnetic core 27 is disposed to extend in the Y-axis direction. The wiring portions 123bP and 123bN of the power-side bus bars 221P and 221N are passed through the inner hole of the magnetic core 27. As illustrated in FIG. 11, each of the power-side bus bars 221P and 221N have a shape bent in a crank shape. The magnetic core 27 is disposed between the connection terminals 121P and 121N and the wiring portions 123cP and 123cN which are crank-shaped bent portions in the Y-axis direction.

The filter capacitor 28 is vertically sandwiched between the wiring portions 123dP and 123dN of the power-side bus bars 221P and 221N, and the wiring portions 126bP and 126bN of the supply-side bus bars 222P and 222N. One filter capacitor 28 is connected between the supply-side bus bar 222P and the ground, and one filter capacitor 28 is connected between the supply-side bus bar 222N and the ground.

In the capacitor module 2 of the present example embodiment, the magnetic core 27 and the filter capacitor 28 are disposed side by side in plan view with their side surfaces opposing each other. According to this configuration, the magnetic core 27 and the filter capacitor 28 can be installed in a relatively narrow space. It is possible to take measures against noise in the direct-current assembly 22 while avoiding an increase in size of the capacitor module 2.

In the capacitor module 2 of the present example embodiment, the power-side bus bars 221P and 221N are bent in a crank shape in side view, and the magnetic core 27 and the filter capacitor 28 are disposed side by side with the bent portions of the power-side bus bars 221P and 221N interposed therebetween. According to this configuration, the power-side bus bars 221P and 221N, the magnetic core 27, and the filter capacitor 28 can be efficiently disposed in a narrower space.

The supply assembly 23 has six supply terminals 231P, 232P, 233P, 231N, 232N, and 233N to the inverter circuit 31.

The positive-side supply terminals 231P, 232P, and 233P include three supply-side terminals 113P of the positive-side first bus bar 11P and three supply-side terminals 125P of the positive-side second bus bar 12P.

Negative-side supply terminals 231N, 232N, and 233N include three supply-side terminals 113N of the negative-side first bus bar 11N and three supply-side terminals 125N of the negative-side second bus bar 12N.

As illustrated in FIGS. 10 and 7, the first bus bar 11 extending from a position of the supply assembly 23 is disposed only toward the capacitor 15 (−X side) relative to the supply assembly 23, and the second bus bar 12 extending from a position of the supply assembly 23 is disposed only opposite to the capacitor 15 (+X side) with respect to the supply assembly 23. That is, the first bus bar 11 and the second bus bar 12 overlap each other only at the supply assembly 23 in plan view.

According to this configuration, since a portion where the first bus bar 11 and the second bus bar 12 are close to each other is reduced, the heat of the second bus bar 12 connected to the DC power source 6 is less likely to be transferred to the first bus bar 11. As a result, heat is less likely to be transferred to the capacitor 15 connected to the first bus bar 11.

In the capacitor module 2 according to the present example embodiment, as illustrated in FIGS. 6 and 7, the alternating-current assembly 21 and the direct-current assembly 22 are disposed side by side in plan view (when viewed in the Z-axis direction) with their side surfaces opposing each other. In the present example embodiment, the alternating-current assembly 21 and the direct-current assembly 22 are arranged along the X-axis direction. That is, the alternating-current assembly 21 and the direct-current assembly 22 are disposed side by side in plan view (when viewed in the Z-axis direction) and one side view (when viewed in the Y-axis direction). The side face, of the alternating-current assembly 21, facing the +X side and the side face, of the direct-current assembly 22, facing the −X side face each other in the X-axis direction. That is, the alternating-current assembly 21 and the direct-current assembly 22 are disposed with the side surfaces thereof opposing each other in a direction (X-axis direction) along the other side view. The supply assembly 23 is located between the alternating-current assembly 21 and the direct-current assembly 22 in plan view. Specifically, the supply terminals 231P, 231N, 232P, 232N, 233P, and 233N are arranged in a row in the Y-axis direction in a region extending along the Y-axis direction between the alternating-current assembly 21 and the direct-current assembly 22.

According to the above configuration, the distance in the horizontal direction (X-axis direction) between the power-side bus bars 221P and 221N that have high in temperature due to large current flowing and the capacitor 15 that is required to avoid high temperature can be greatly separated because the supply assembly 23 is disposed therebetween. Consequently, it is possible to prevent the heat of the power-side bus bars 221P and 221N from being transferred to the capacitor 15. It is possible to prevent the electric characteristics of the capacitor 15 from changing or the life from being shortened by the high temperature.

Furthermore, since the alternating-current assembly 21 and the direct-current assembly 22 are disposed side by side and the supply assembly 23 is disposed therebetween, the shapes of the bus bar included in the supply assembly 23 and the bus bar included in the direct-current assembly can be freely designed and connected to the supply assembly 23. Therefore, the shapes of the direct-current assembly and the alternating-current assembly are not limited to each other, and it is possible to design the bus bar capable of reducing the ESL.

Note that the position of the supply assembly 23 is not limited to between the alternating-current assembly 21 and the direct-current assembly 22. The supply assembly 23 may be located at a position at which the supply assembly 23 overlaps the alternating-current assembly 21 or the direct-current assembly 22 in plan view. Alternatively, the supply assembly 23 may be located at a position at which the supply assembly 23 overlaps both the alternating-current assembly 21 and the direct-current assembly 22. That is, the position of the supply assembly 23 can be changed as long as it is within the range of the outer peripheral region A illustrated in FIG. 7. The supply assembly 23 can be configured to be located inside the outer peripheral region A that collectively surrounds both the alternating-current assembly 21 and the direct-current assembly 22 in plan view. According to this configuration, since the supply assembly 23 is not located outside the alternating-current assembly 21 or outside the direct-current assembly in plan view, the area in which the alternating-current assembly 21 and the direct-current assembly 22 overlap can be reduced in plan view. As a result, it is possible to prevent heat from being transferred from a high-temperature portion (power-side bus bars 221P and 221N) of the second bus bar 12 to the first bus bar 11 and the capacitor 15.

As illustrated in FIG. 3, the capacitor module 2 according to the present example embodiment includes a resin portion 24 that holds the alternating-current assembly 21 and the direct-current assembly 22. The resin portion 24 surrounds the side surfaces and the bottom faces of the alternating-current assembly 21 and the direct-current assembly 22. That is, resin portion 24 is a housing of the capacitor module 2. The resin portion 24 has a shape that opens upward, but may include a lid that covers the alternating-current assembly 21 and the direct-current assembly 22 from above. Alternatively, a sealing resin may be poured from the upper surface sides of the alternating-current assembly 21 and the direct-current assembly 22 to resin-seal the alternating-current assembly 21 and the direct-current assembly 22.

The resin portion 24 has a fixing portion 25 fixed to an external device at an outer peripheral portion in plan view. The external device is, for example, the housing 7 of the inverter module 1 illustrated in FIG. 1. According to this configuration, the capacitor module 2 can be easily mounted on the inverter module 1 or the like.

A noise shield 26 made of aluminum is attached to the lower surface of the resin portion 24. The noise shield 26 has a plate shape extending along a plane (XY plane) orthogonal to the vertical direction. The noise shield 26 covers the alternating-current assembly 21, the direct-current assembly 22, and the supply assembly 23 from the lower surface side. By providing the noise shield 26, it is possible to suppress the propagation of noise in the vertical direction in the inverter module 1.

In the present example embodiment, as illustrated in FIG. 1, the drive board 41 and the power module 3 are disposed above the upper surface of the capacitor module 2, and the control board 40 is disposed under the lower surface of the capacitor module 2. In this configuration, since the noise shield 26 is disposed between the control board 40, and the drive board 41 and the power module 3, it is possible to suppress the noise generated from the drive board 41 from being transmitted to the control board 40.

As illustrated in FIGS. 3 and 4, capacitor module 2 has a plurality of cylindrical screw bosses 241 protruding downward from the lower surface of the resin portion 24. In the present example embodiment, the resin portion 24 has 11 screw bosses 241. The screw boss 241 protrudes downward from the noise shield 26 through a through hole provided in the noise shield 26.

Lower end positions of the 11 screw bosses 241 are located on one plane. As illustrated in FIG. 4, the control board 40 can be screwed to the screw bosses 241. By fixing the control board 40 to the screw boss 241 whose lower end positions are aligned, the control board 40 can be installed parallel to the lower surface of the capacitor module 2.

The control board 40 has a flat surface 40a facing the capacitor module 2 in the vertical direction at the upper surface thereof. In addition, the control board 40 is installed at a position at which it overlaps both the alternating-current assembly 21 and the direct-current assembly 22 in plan view. That is, on the lower surface of the capacitor module 2 of the present example embodiment, a member (control board 40) having the flat surface 40a facing the lower surface of the capacitor module 2 and overlapping at least part of both the alternating-current assembly 21 and the direct-current assembly 22 in plan view can be installed.

According to the above configuration, the capacitor module 2 and the member (for example, the control board 40) installed under the lower surface of the capacitor module 2 can be compactly disposed in the vertical direction. The internal space of the housing 7 of the inverter module 1 can be efficiently used. The inverter module 1 can be easily downsized. Since the noise shield 26 and the control board 40 can be disposed at a uniform interval, the noise shielding function by the noise shield 26 can be effectively exerted.

The inverter module 1 of the present example embodiment is mounted on a motor assembly (not illustrated). The motor module is mounted on a vehicle. As described above, since the inverter module of the present example embodiment has the capacitor inverter that reduces the thermal influence and the ESL, the inverter module has high performance and can withstand failure. Therefore, in the motor assembly on which the motor module is mounted, it is possible to withstand a large current and to extend the life.

Features of the above-described preferred example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A capacitor module that smooths a voltage of an inverter circuit, the capacitor module comprising:
    a supply assembly including a connection terminal to the inverter circuit;
    an alternating-current assembly including a capacitor and a plate-shaped first bus bar connecting the capacitor and the supply assembly; and
    a direct-current assembly including a plate-shaped second bus bar connecting a DC power source and the supply assembly; wherein
    the alternating-current assembly and the direct-current assembly are side by side in a plan view and in one side view of the capacitor module, and are arranged with side surfaces of the alternating-current assembly and the direct-current assembly opposing each other in an opposite side view of the capacitor module;
    the supply assembly is located inside an outer peripheral region collectively surrounding both the alternating-current assembly and the direct-current assembly in the plan view;
    the plate-shaped first bus bar extends in or substantially in a first direction in a plan view; and
    the plate-shaped second bus bar extends in or substantially in a second direction in the plan view, the second direction being parallel to the first direction.

2. The capacitor module according to claim 1, wherein the supply assembly is located between the alternating-current assembly and the direct-current assembly in the plan view.

3. The capacitor module according to claim 2, wherein the plate-shaped first bus bar and the plate-shaped second bus bar overlap each other only at the supply assembly in the plan view.

4. The capacitor module according to claim 1, wherein the supply assembly is located at a position at which the supply assembly overlaps the alternating-current assembly or the direct-current assembly in the plan view.

5. The capacitor module according to claim 1, wherein
    the plate-shaped first bus bar includes a positive-side first bus bar and a negative-side first bus bar; and
    the plate-shaped first bus bar includes, between the capacitor and the supply assembly, a proximity arrangement portion where the positive-side first bus bar and the negative-side first bus bar overlap and approach each other in a plate thickness direction.

6. The capacitor module according to claim 1, wherein
    the plate-shaped second bus bar includes a positive-side second bus bar and a negative-side second bus bar;
    each of the positive-side second bus bar and the negative-side second bus bar includes two bus bars that are a power-side bus bar and a supply-side bus bar;
    each of the two power-side bus bars includes a connection terminal to a DC power source and a connection terminal to the supply-side bus bar; and
    each of the two power-side bus bars includes, between the connection terminals, a portion where a plate surface of each of the two power-side bus bars extends along a direction in which the alternating-current assembly and the direct-current assembly are arranged.

7. The capacitor module according to claim 1, further comprising:
    a magnetic core mounted on the plate-shaped second bus bar; and
    a filter capacitor connected to the plate-shaped second bus bar; wherein
    the magnetic core and the filter capacitor are side by side in the plan view with side surfaces of the magnetic core and the filter capacitor opposing each other.

8. The capacitor module according to claim 7, wherein
    the plate-shaped second bus bar includes a positive-side second bus bar and a negative-side second bus bar;
    each of the positive-side second bus bar and the negative-side second bus bar includes two bus bars that respectively are a power-side bus bar and a supply-side bus bar;
    the power-side bus bar is bent into a crank shape in a side view; and
    the magnetic core and the filter capacitor are side by side with a bent portion of the power-side bus bar interposed therebetween.

9. The capacitor module according to claim 1, further comprising:
a resin portion that holds the alternating-current assembly and the direct-current assembly; and
a noise shield made of aluminum and attached to the resin portion.

10. The capacitor module according to claim 1, wherein the supply assembly is on an upper surface of the capacitor module; and
on a lower surface of the capacitor module, a structure with a flat surface opposes the lower surface and overlaps at least a portion of both the alternating-current assembly and the direct-current assembly in the plan view is allowed to be installed.

11. The capacitor module according to claim 1, further comprising a fixing portion fixed to an external device.

12. The capacitor module according to claim 1, wherein the plate-shaped first bus bar includes a positive-side first bus bar and a negative-side first bus bar; and
the positive-side first bus bar and the negative-side first bus bar oppose each other via an insulating sheet thinner than a plate thickness of the plate-shaped first bus bar at a position close to each other.

13. The capacitor module according to claim 1, wherein the plate-shaped second bus bar includes a positive-side second bus bar and a negative-side second bus bar; and
the positive-side second bus bar and the negative-side second bus bar oppose each other via an insulating sheet thinner than a plate thickness of the plate-shaped second bus bar at a position close to each other.

14. An inverter module comprising:
the capacitor module according to claim 1; and
the inverter circuit.

15. A motor assembly comprising the inverter module according to claim 14.

16. A capacitor module that smooths a voltage of an inverter circuit, the capacitor module comprising:
a supply assembly including a connection terminal to the inverter circuit;
an alternating-current assembly including a capacitor and a plate-shaped first bus bar connecting the capacitor and the supply assembly; and
a direct-current assembly including a plate-shaped second bus bar connecting a DC power source and the supply assembly; wherein
the alternating-current assembly and the direct-current assembly are side by side in a plan view and in one side view of the capacitor module, and are arranged with side surfaces of the alternating-current assembly and the direct-current assembly opposing each other in an opposite side view of the capacitor module;
the supply assembly is located inside an outer peripheral region collectively surrounding both the alternating-current assembly and the direct-current assembly in the plan view;
the supply assembly is located between the alternating-current assembly and the direct-current assembly in the plan view; and
the plate-shaped first bus bar and the plate-shaped second bus bar overlap each other only at the supply assembly in the plan view.

17. The capacitor module according to claim 16, wherein the plate-shaped first bus bar includes a positive-side first bus bar and a negative-side first bus bar; and
the plate-shaped first bus bar includes, between the capacitor and the supply assembly, a proximity arrangement portion where the positive-side first bus bar and the negative-side first bus bar overlap and approach each other in a plate thickness direction.

18. The capacitor module according to claim 16, further comprising:
a resin portion that holds the alternating-current assembly and the direct-current assembly; and
a noise shield made of aluminum and attached to the resin portion.

19. A capacitor module that smooths a voltage of an inverter circuit, the capacitor module comprising:
a supply assembly including a connection terminal to the inverter circuit;
an alternating-current assembly including a capacitor and a plate-shaped first bus bar connecting the capacitor and the supply assembly;
a direct-current assembly including a plate-shaped second bus bar connecting a DC power source and the supply assembly;
a magnetic core mounted on the plate-shaped second bus bar; and
a filter capacitor connected to the plate-shaped second bus bar; wherein
the alternating-current assembly and the direct-current assembly are side by side in a plan view and in one side view of the capacitor module, and are arranged with side surfaces of the alternating-current assembly and the direct-current assembly opposing each other in an opposite side view of the capacitor module;
the supply assembly is located inside an outer peripheral region collectively surrounding both the alternating-current assembly and the direct-current assembly in the plan view; and
the magnetic core and the filter capacitor are side by side in the plan view with side surfaces of the magnetic core and the filter capacitor opposing each other.

20. The capacitor module according to claim 19, wherein the plate-shaped second bus bar includes a positive-side second bus bar and a negative-side second bus bar;
each of the positive-side second bus bar and the negative-side second bus bar includes two bus bars that respectively are a power-side bus bar and a supply-side bus bar;
the power-side bus bar is bent into a crank shape in a side view; and
the magnetic core and the filter capacitor are side by side with a bent portion of the power-side bus bar interposed therebetween.

\* \* \* \* \*